Feb. 25, 1941. J. GONZALEZ 2,233,256
DRIP COFFEE PERCOLATOR CONSTRUCTION
Filed July 1, 1939
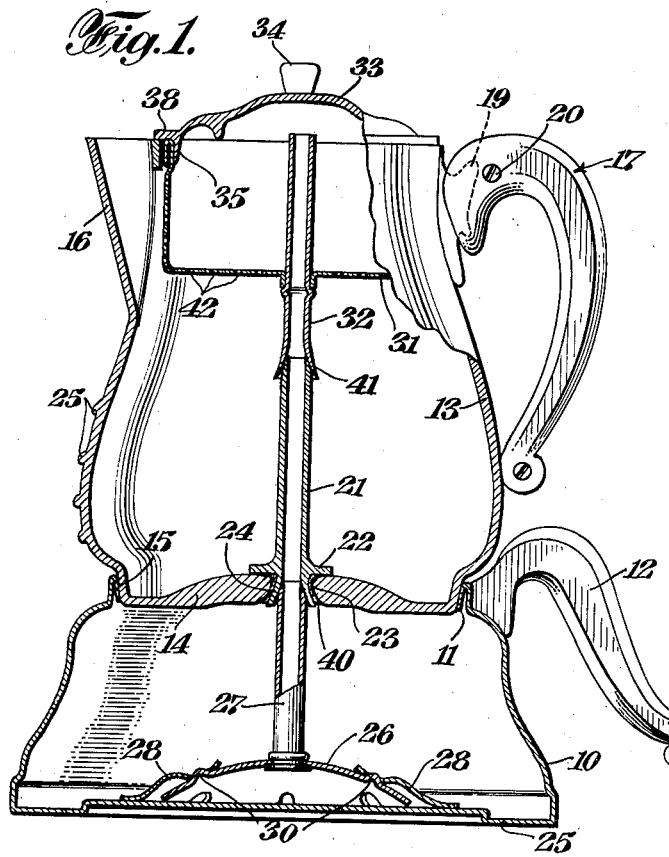
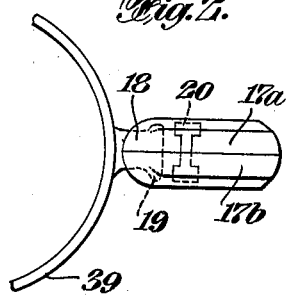
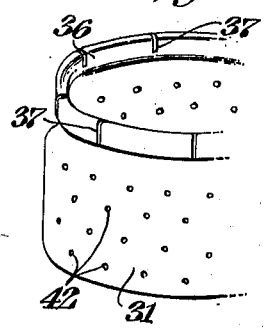
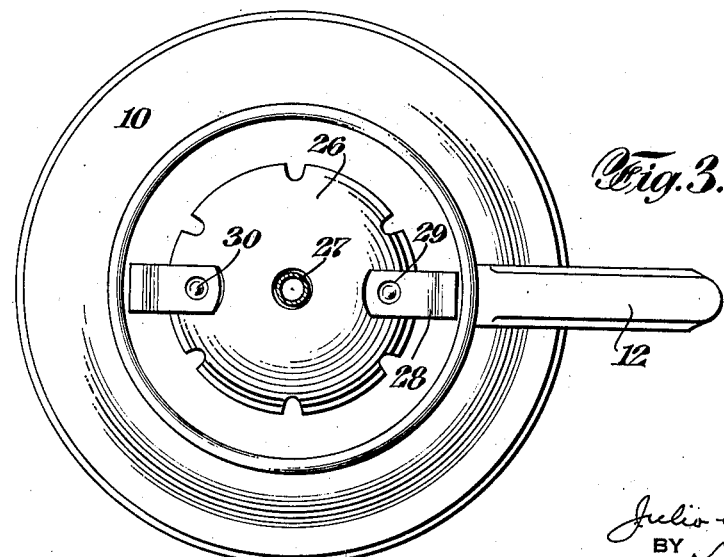
INVENTOR
Julio Gonzalez
BY
Kenyon & Kenyon
ATTORNEYS Patented Feb. 25, 1941

2,233,256

UNITED STATES PATENT OFFICE 2,233,256

DRIP COFFEE PERCOLATOR CONSTRUCTION

Julio Gonzalez, Jersey City, N. J.

Application July 1, 1939, Serial No. 282,354

6 Claims. (Cl. 53—3)

This invention relates to improvements in drip coffee percolators.

The devices which have been in greatest popular use heretofore for making coffee are the old-fashioned coffee pot wherein the coffee grounds are in direct contact with water at its boiling point and the ordinary percolator wherein the water is raised by bubbles of vapor passing upwardly through a tube so as to pass onto and thence downwardly through coffee grounds in a perforate coffee receptacle at the top of the coffee pot, the coffee dripping from the coffee grounds in the receptacle back to the main body of liquid in the coffee pot. Both of these devices are not altogether satisfactory, inasmuch as the quality of the coffee that is made in this way is inferior. Another device which has recently come into popular use is the vacuum type of coffee-making device wherein water is boiled out of a container leaving vapor in the container, the vapor thereafter condensing upon discontinuing heating so as to produce a vacuum and suck the water back through coffee grounds in a perforate coffee receptacle into the original container for the water. This type of device for preparing coffee is not altogether satisfactory, however, inasmuch as the prepared coffee tends to cool off after it has been prepared unless the container which contains it is again placed in direct contact with the flame after the coffee has been prepared. Moreover, the container which contains the prepared coffee is usually spherical in form and is inconvenient to handle. In addition to coffee-making devices of the character referred to which have been used most extensively heretofore, a variety of different constructions have been proposed, but these constructions have been so complex, costly to manufacture and inconvenient to use and clean, and prejudicial to coffee flavor, that they have never proved popular commercially.

It is a purpose of this invention to afford a drip percolator for making coffee which overcomes the disadvantages of the coffee-making devices that have heretofore been used. It is a purpose of this invention to afford a device which, while simple and economical to manufacture, produces coffee of a very high standard of excellence as to flavor and aroma. It is a further purpose of this invention to afford a drip percolator that can be readily assembled and disassembled, that is very convenient to handle and that does not contain any parts which are inaccessible or difficult to clean. It is an advantage of this invention that coffee after it has been prepared can be kept hot even though the container for the prepared coffee is out of direct contact with the flame. It is also an advantageous feature of this invention that after the coffee has been prepared the coffee can be kept out of contact with the coffee grounds or with coffee that may drip from the grounds.

Further purposes, features and advantages of this invention will be apparent in connection with the following description of a specific embodiment of this invention which is shown for purposes of exemplification in the accompanying drawing, wherein Figure 1 is a sectional elevation of a drip coffee percolator embodying this invention;

Fig. 2 is a fragmentary top plan view of the upper container and the handle therefor;

Fig. 3 is a top plan view of the lower container; and

Fig. 4 is a perspective fragmentary view of the receptacle for coffee grounds that forms part of the drip coffee percolator.

The drip coffee percolator comprises a lower container 10 which may be made of any suitable material such as metal. The lower container may be made of aluminum or stainless steel, for example. The lower container 10 has a mouth which is surrounded by an annular member 11 which is slightly inclined so that the diameter of the mouth of the lower container adjacent the lower margin of the member 11 is somewhat less than adjacent the upper margin of the member 11. A handle 12 can be rigidly attached to the lower container 10 by any suitable means (not shown) such as that described in further detail hereinbelow in connection with the handle for the upper container.

The upper container 13 is preferably pitcher-shaped and has a flat bottom 14. About the bottom 14 is a tapered annular wall 15 which fits within the member 11. The taper of the wall 15 corresponds with the taper of the member 11 so that the upper container 13 is adapted to slide telescopically into the mouth of the lower container 10 and to be maintained in a vertical position thereby. Preferably the annular wall 15 and the member 11 are so shaped that when the upper container is maintained in position in the mouth of the lower container 10 a substantially water-tight seal is afforded between the bottom of the upper container and the mouth of the lower container.

The member 11 is preferably of resilient construction as by being curved as shown in the drawing so that it is yieldable and adapted to maintain a vapor-tight joint, notwithstanding movement of the bottom 14 of the upper container relative to the member 11.

The upper container is provided with a mouth or spout 16 and with a handle 17. The upper container may be made of any suitable material, although in this embodiment the upper container is preferably made of glass as shown. The handle 17 is secured to a projection 18 having a head 19 that is integral with the upper container. The portion of the handle 17 which is adjacent the projection 18 is made in a plurality of parts, e. g., in two parts conformed on the interior thereof to the shape of the projection 18 and of head 19. These parts which are indicated in Fig. 2 as 17a and 17b are clamped together by one or more bolts 20 or other fastening means so as to be held together with the parts 17a and 17b clamped about the head 19 and projection 18. In this manner the handle 17 is rigidly secured to the upper container 13. While the handle is shown as secured to the container 13 only at the upper end thereof in the manner described, the handle may be secured at both ends to the container, in the same manner. The handle is preferably made of some material that is not a good conductor of heat such as wood, vulcanized rubber or the like.

An intermediate percolator tube section 21 passes through the bottom 14 of the upper container and is rigidly secured to the bottom 14. Preferably the tube 21 is provided with an annular ring 22 abutting the upper surface of the bottom of the container. The bottom of the container has a hole 23 therein which is outwardly flared so as to become wider progressing downwardly. The tube 21 has a mouth 24 projecting below the ring 22 which projecting mouth can be inserted into the hole 23 and rigidly clamped therein by pressing the projecting mouth outwardly as by a spinning operation. Especially when the upper container is made of glass, it is desirable to interpose between the tube material and the bottom of the container 13 a suitable water-resistant material 40 such as a water-proof cement. In this manner the intermediate percolator tube 21 can be rigidly attached to the bottom of the upper container and the bottom of the upper container can be made water-tight. The tube 21 extends above the bottom of the upper container so that the upper mouth thereof is above the level of liquid that is to be retained in the upper container. For example, if the upper container is designed to contain four cups of coffee, the upper mouth of the tube 21 is sufficiently spaced from the bottom of the upper container so that the upper container can contain four cups of coffee without having the coffee run down the tube 21. It is preferable according to this invention to calibrate the upper container so that the amount of coffee contained therein can be readily observed. When the upper container is made of glass, this can be done conveniently by calibrations 25 which are cast in the body of the container. Alternatively, calibrations can be etched on the container or marked thereon with some waterproof paint or lacquer. If the container is made of metal, then a suitable sight glass is preferably employed through which the amount of coffee in the upper container can be observed from outside the container. In the device shown in Fig. 1, the calibrations 25 are appropriate to indicate four cups of coffee.

Carried by the bottom 25 of the lower container is a percolator tube base 26 to which is rigidly secured the lower percolator tube section 27. The combined height of the base 26 and tube section 27 is such that when the bottom of the upper container is fitted within the mouth of the lower container, the flared lower mouth of the intermediate percolator tube section forms a liquid-tight joint with the upper mouth of the lower percolator tube section. The upper end of tube section 27 is preferably slightly tapered to fit tightly within the flared inner wall of mouth 24. Preferably the fit between the bottom of the upper container with the mouth of the lower container is such that a substantial proportion of the weight of the upper container is borne by the connection between the intermediate and lower percolator tube sections so as to tend to maintain a liquid-tight joint between these two percolator tube sections.

Attached to the bottom 25 of the lower container are spring clips 28 having perforations 29 adjacent the end thereof. The percolator tube base can be centered on the bottom of the lower container by sliding it underneath the clips 28 until projections 30 of the base 26 snap into the holes 29 at the end of clips 28. In this manner the lower percolator tube section and percolator tube base can be centered so that no difficulty will be encountered in having the upper end of the lower percolator tube section register with the lower mouth of the intermediate percolator tube section when the upper container is placed in the mouth of the lower container. Any other suitable centering device associated with the percolator tube base and bottom of the lower container may also be used.

A coffee receptacle 31 having a multiplicity of perforations 42 is disposed in the upper part or mouth of the upper container. Passing through the bottom of the receptacle 31 is the upper percolator tube section 32. Preferably the upper percolator tube section is rigidly affixed to the bottom of the receptacle 31. The inner wall of the lower mouth 41 of the percolator tube section 32 is flared outwardly as shown so that the upper end of the intermediate percolator tube section will contact with the flared wall of the lower mouth of section 32 and form a liquid-tight seal therefor and at the same time act as a support for the section 32 and the coffee receptacle 31 carried thereby. Preferably the upper end of tube section 21 is tapered so as to make a tight joint with the inner wall of mouth 41. The upper end of the tube section 32 is above the normal level of coffee grounds contained in the receptacle 31. Disposed over the coffee receptacle 31 is a cover 33 having a handle 34 on the top thereof. Adjacent the margin of the cover is an annular flange 35 which fits within the upper edge 36 of the coffee receptacle. Preferably the edge 36 of the coffee receptacle has slots 37 therein so that the edge may be resilient and permit the flange 35 to be pressed thereagainst to form a frictional fit between the flange 35 of the cover and the edge 36 of the receptacle. By this construction removal of the cover 33 will at the same time remove the receptacle 31 and the percolator 32 from the upper part of the container 13. It is thus apparent that the receptacle 31, percolator tube 32 and cover 33 form a unit which can be filled with coffee, placed in the device and thereafter removed therefrom whenever it may be desired to do so. The cover 33 has an outwardly-extending ring 38 which is sufficiently wide to overlie the upper edge 39 of the container 13. Thus if the cover is removed together with the coffee receptacle 31 and tube section 32 from the device, the cover can be replaced after having detached it from the coffee receptacle, so that it can be used to cover the mouth of the container 13. This is advantageous, inasmuch as the coffee grounds, after they have been used in preparing the coffee can be removed from the device so that the coffee as freshly prepared will not be adversely affected by any coffee which may continue to drip from the coffee grounds after active percolation has been discontinued.

While the use of the drip coffee percolator above described is believed to be apparent, the use of the device will be described briefly as follows: Assuming that it is desired to make four cups of coffee, for example, sufficient ground coffee to prepare the four cups of coffee is placed in the receptacle 31. The cover is then placed in the receptacle 31 and the unit consisting of receptacle 31, cover 33 and tube section 32 is put in place at the top of the container 13. The lower end of the tube 32 fits over and rests on the upper end of tube 21 forming a substantially liquid-tight joint. The percolator tube section 27 and base 26 are then centered on the bottom of the lower container 10 and sufficient water to make at least four cups of coffee is placed in this container. The upper container is then fitted in the mouth of the lower container so as to be in the position shown in Fig. 1. The drip coffee percolator is now completely assembled and ready to be placed on the stove. Upon heating the water in the lower container as by use of a gas flame or an electric stove water will be carried up through the percolator tube on bubbles of vapor and will be distributed about the coffee in receptacle 31 and will drip down through the coffee into the container 13 in which it will be retained. Since the joint between the bottom of container 13 and the mouth of container 10 is substantially vapor-tight, the boiling of the water in the lower container will tend to accelerate the percolation of the water up through the tube sections and into the coffee in the receptacle 31 due to pressure of vapor built up in the lower container. The percolation is continued until it is observed by the calibrations 25 that four cups of coffee are contained in the container 13 and then the heat may be turned off and the percolation discontinued. The drip percolator may be left as it is and the coffee poured from the upper container 13, but preferably, if the coffee is to stand for a substantial length of time, the detachable unit consisting of the receptacle 31, the tube section 32 and cover 33 is removed from the container 13, and the cover 33, after having been detached from the receptacle 31, is replaced on the container 13. In this manner any dripping of the coffee grounds into freshly-prepared coffee is avoided. If a substantial amount of boiling water is left in the lower container after the percolation of the desired amount of coffee has been completed, this body of hot water will tend to keep the coffee in the upper container hot, even though the heat is completely turned off. Alternatively, a very slight amount of heat can be used under the lower container, the heat being insufficient to cause active percolation. In such case the coffee in the upper container can be kept hot indefinitely. Further in this connection, it is to be noted that after the coffee has been extracted from the coffee grounds, the liquid which contains the coffee is not in a container which comes in direct contact with the flame either during the preparation of the coffee or after the coffee has been prepared. Moreover, the coffee after it has been prepared is not actively boiled. In this manner the flavor of the coffee is preserved to the maximum degree.

It is also advantageous in the use of the drip percolator above described that the upper container, if desired, can be placed upon a table or other support and that it is not necessary to replace it in the mouth of the lower container after coffee has been prepared.

After the coffee has been prepared and dispensed the percolator lends itself to a thorough cleaning in a very convenient manner. The receptacle 31 and tube 32 being removable, can be cleaned very easily. Since the joint between the percolator tube sections 21 and 32 is spaced from the bottom of the coffee receptacle, the tube section 21 does not interfere with introducing the hand or some cleaning device into all parts of the upper container so that it can be thoroughly cleaned. The lower container also can be thoroughly cleaned, inasmuch as the lower tube section 27 and tube base 26 can be removed from the lower container and thoroughly cleaned.

While this invention has been described in connection with a specific embodiment thereof, it is to be understood that this has been done for the purpose of affording a specific example of my invention and that the structure of this specific embodiment can be varied without departing from the scope of my inventive idea. Accordingly the scope of this invention is to be governed by the language of the following claims.

I claim:

1. In a drip coffee percolator including a lower container having an open mouth, a readily removable upper container adapted for disposition within the mouth of the lower container, a perforate coffee receptacle adapted for disposition within the mouth of said upper container, and a cover for said receptacle, the novel sectional percolator tube comprising a lower percolator tube section attached to a percolator tube base carried by the bottom of said lower container in readily detachable relation thereto, an intermediate percolator tube section passing through and rigidly secured to the bottom of said upper container and having a lower mouth approximately flush with the lower surface of the bottom of said upper container and including an outwardly flaring inner wall adapted to fit over the upper end of said lower percolator tube section, and an upper percolator tube section passing through the bottom of said perforate coffee receptacle with a lower mouth provided with an outwardly flaring inner wall adapted to fit over the upper mouth of said intermediate percolator tube section and form a liquid tight joint therewith, said joint being at an intermediate position between the bottom of said receptacle and the bottom of said upper container and spaced from the bottom of receptacle so that said upper container can be readily cleaned and spaced from the bottom of said upper container so as to be above the level of the maximum amount of liquid desired to be retained in said upper container, said receptacle and upper percolator tube section together with said cover being readily removable from said upper container and from the upper mouth of said intermediate percolator tube section.

2. In a drip coffee percolator including a lower container having an open mouth, an upper container having an imperforate bottom adapted for disposition within the mouth of the lower container, a perforate coffee receptacle adapted for disposition within the mouth of said upper container, a cover for the receptacle, and a sectional percolator tube arranged to direct water from said lower container into said coffee receptacle so that the water discharged from the upper end thereof will pass through the perforations in said coffee receptacle into said upper container, the novel mounting and construction of the sectional percolator tube comprising an intermediate percolator tube section passing through the bottom of said upper container and extending upwardly from the bottom of said container, a hole in the bottom of the upper container that is flared outwardly so as to become larger progressing downwardly, and an outwardly flared lower end of said intermediate percolator tube section pressed against said outwardly flared hole in the bottom of said upper container so as to be rigidly secured thereto and so as to provide an outwardly flaring lower mouth for said intermediate percolator tube section adapted to fit over the upper end of a lower percolator tube section carried by said lower receptacle, the upper end of said intermediate percolator tube section being adapted to form a liquid tight seal with the lower end of an upper percolator tube section passing through the bottom of said perforate coffee receptacle.

3. A drip coffee percolator according to claim 2 wherein said upper container is made of glass and said intermediate percolator tube section is rigidly secured to the bottom thereof in the manner aforesaid with a water-resistant material interposed between the glass and said tube.

4. In a drip coffee percolator including a lower container having an open mouth, an upper container having an imperforate bottom adapted for disposition within the mouth of the lower container, a perforate coffee receptacle adapted for disposition within the mouth of said upper container, a cover for the receptacle, and a sectional percolator tube arranged to direct water from said lower container into said coffee receptacle so that water discharged from the upper end thereof will pass through the perforations in said coffee receptacle into said upper container, the construction of said sectional percolator tube in combination with said upper and lower containers comprising an intermediate percolator tube section passing through the bottom of said upper container and rigidly united therewith and extending upwardly from the bottom of said upper container and with the lower mouth thereof adjacent the under side of the bottom of said upper container and provided with an outwardly flared inner wall, said mouth of said lower container and the side wall of said upper container being adapted to slide telescopically so that a substantial proportion of the weight of said upper container and parts carried thereby is carried by the joint in said sectional percolator tube sections between said outwardly flared inner wall of the lower mouth of the intermediate percolator tube section and the upper end of a lower percolator tube section attached to a percolator tube base carried by the bottom of said lower container to form a liquid tight seal at said joint, and the upper end of said intermediate percolator tube section forming a liquid tight joint with the lower end of an upper percolator tube section passing through the bottom of said perforate coffee receptacle when the lower end of said intermediate percolator tube section is resting on the upper end of said lower percolator tube section.

5. A drip coffee percolator according to claim 4 wherein the mouth of said lower container and the bottom of said upper container fit together sufficiently closely to form a substantially vapor-tight seal.

6. In a drip coffee percolator including a lower container having an open mouth, an upper container having an imperforate bottom adapted for disposition within the mouth of the lower container, a perforate coffee receptacle adapted for disposition within the mouth of the upper container, and a sectional percolator tube arranged to direct water from the lower container into said coffee receptacle so that water discharged from the upper end thereof will pass through the perforations in said upper receptacle into said upper container and including a percolator tube section rigidly attached to and passing through the bottom of said upper container, the combination with said perforate coffee receptacle of an upper percolator tube section passing through the bottom of said receptacle and rigid therewith and having an outwardly flaring inner wall adapted to fit over the upper end of said percolator tube section to form a liquid tight joint that is spaced from the bottom of said upper container so that said upper container will retain a desired amount of liquid when said receptacle and upper percolator tube are removed, and a common cover for said receptacle and the mouth of said upper container, said receptacle, upper percolator tube section and cover being removable as a unit from the mouth of said upper container, said cover being removable from said receptacle and adapted to be replaced over the mouth of said upper container when said receptacle and upper percolator tube section are removed from said upper container, said cover having a downwardly extending marginal annular flange that fits within the upper marginal portion of said receptacle, and said upper marginal portion of said receptacle having a plurality of slots therein and being adapted to form a resilient frictional fit with said downwardly extending flange of said cover.

JULIO GONZALEZ.